(12) United States Patent
Lehzen

(10) Patent No.: US 7,783,814 B2
(45) Date of Patent: Aug. 24, 2010

(54) SAFETY MODULE AND AUTOMATION SYSTEM

(75) Inventor: Michael Lehzen, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 86 days.

(21) Appl. No.: 11/944,931

(22) Filed: Nov. 26, 2007

(65) Prior Publication Data

US 2008/0126636 A1    May 29, 2008

(30) Foreign Application Priority Data

Nov. 28, 2006  (DE) .................. 10 2006 056 420

(51) Int. Cl.
*G06F 13/14* (2006.01)
(52) U.S. Cl. .................... 710/305; 714/11
(58) Field of Classification Search .......... 710/305, 710/311–312; 714/10–11
See application file for complete search history.

(56) References Cited

U.S. PATENT DOCUMENTS 4,528,662 A * 7/1985 Floyd et al. .................. 370/216
6,823,251 B1 * 11/2004 Giers .......................... 701/76
7,295,442 B2 * 11/2007 Garnett et al. .............. 361/728
2006/0042846 A1    3/2006 Kojori et al. ............... 180/65.8

FOREIGN PATENT DOCUMENTS

| DE | 198 15 147 A1 | 10/1998 |
| DE | 199 25 693 A1 | 12/2000 |
| DE | 199 28 517 A1 | 11/2001 |
| DE | 103 53 950 A1 | 6/2005 |
| EP | 1 297 394 B1 | 6/2001 |

* cited by examiner

*Primary Examiner*—Clifford H Knoll
(74) *Attorney, Agent, or Firm*—Whitham Curtis Christofferson & Cook, PC

(57) ABSTRACT

A safety module (5) with terminals for connection to a bus system control module (2), which is provided for connecting input/output modules (4a, 4b) for field devices, via a databus (3), has a data processing unit (µC2), which is set up corresponding to the bus system control unit (2) for identical processing of the data transmitted via the databus (3). The data processing unit (µC2) for ensuring correct data communication with a safety function is set up in such a way that mutual checking of the safety function takes place by means of data exchange via the databus with the bus system control unit (2).

9 Claims, 2 Drawing Sheets

SAFETY MODULE AND AUTOMATION SYSTEM

FIELD OF INVENTION

The invention relates to a safety module with terminals for connection to a bus system control module, which is provided for connecting input/output modules (4a, 4b) for field devices, via a databus.

The invention furthermore relates to an automation system with a bus system control module, a databus and input/output modules, which are connected to the databus, with connection terminals for connecting field bus devices for data communication with the bus system control unit.

BACKGROUND OF THE INVENTION

Databus systems with head modules for controlling the data communication on an internal databus, to which input/output modules are connected, are sufficiently well known. With such bus systems it is possible to set up control and monitoring systems with little wiring complexity and a high degree of flexibility. Often, stringent requirements are placed on ensuring reliable operation for such automation systems in order to safely rule out faults resulting from failure of system components or from faulty data transmission. Hazards for personnel and faults in manufacturing processes etc. should therefore be avoided.

A safe control system which is certified, for example, corresponding to the so-called Class 4 in accordance with the European standard EN 954-1 and the safety integrity level (SIL) 3 in accordance with IEC 61508 parts 1 to 7 typically has head modules or bus system control modules with at least two microcontrollers, which execute a safety program, and, under certain circumstances, in addition also a standard application in redundant fashion. Depending on the nature of the redundancy selected (diversity or homogeneous), the two microcontrollers can be different from one another, but do not necessarily need to be. The two microcontrollers cyclically exchange data via a bus system control module-internal interface in order to be able to implement the necessary mutual checking of the safety functions. This interface is in the form of a point-to-point connection between the two microcontrollers. In this case, the two microcontrollers are typically accommodated on one or more printed circuit boards within a housing of one and the same bus system control module.

Such a solution with an interface module, which has a bus master and a safe control unit with two microprocessors functioning independently of one another, is disclosed in DE 103 53 950 A1. The interface module described can also communicate with a second control unit, which provides unsafe control of at least one non-safety-critical process. In the event of an emergency or in the event of faulty functioning, the safe control unit can take on the tasks of the unsafe control unit or the control of the unsafe processes by means of a bypass.

DE 199 28 517 has disclosed a control system for controlling safety-critical processes with a field bus coupler, to which a safety module is connected. The safety functions are executed completely in the safety module, which for this purpose in turn has two microcontrollers checking one another. The entire safety functionality is eliminated by the safety module, so that the field bus coupling module does not require any safety-relevant design or any safety functions.

DE 198 15 147 A1 has disclosed an arrangement of sensors for monitoring a working device, the sensors forming slaves of a bus system functioning on the master/slave principle. A redundant evaluation unit is connected to the bus system in order to monitor the data traffic on the databus. In the event of a fault being identified, outputs of the evaluation unit are disconnected. The evaluation unit is therefore autonomous as regards to the checking of faults and at the same time takes on the function of safety shutdown.

SUMMARY

The object of the present invention is to provide an improved safety module which makes a more flexible design of an automation system possible.

The object is achieved with the safety module of the type mentioned at the outset by virtue of the fact that the safety module has a data processing unit, which is set up corresponding to the bus system control unit for identical processing of the data transmitted via the databus, and that the data processing unit is set up for ensuring correct data communication with a safety function in such a way that mutual checking of the safety function takes place by means of data exchange via the databus with the bus system control unit.

In contrast to the conventional solutions, the invention therefore proposes that a second, redundant data processing takes place with the aid of the safety module in order to carry out safety checking in conjunction with the identical data processing in the assigned bus system control module. The first data processing provides, parallel to this, the bus system control module known per se, which can in particular be a field bus coupler.

The checking of the safety function now does not take place, as has been conventional to date, within one and the same module, but between the bus system control module and the safety module. The communication interface, which until now has been internal, between the two redundant microcontrollers is therefore moved onto the databus. In addition, the second microcontroller, which until now has been integrated in safe bus system control modules, is moved out into the safety module.

This distribution of the safety functionalities between the bus system control module and the novel, additional safety module has the advantage that flexibly different safety stages can be set up by plugging together safety modules. Redundant data processing is provided by a safety module connected to the bus system control module via the databus. A further data processing and control instance is created by each further added safety module, so that a multiply safeguarded system can be set up variably.

The safety module preferably has an interface control unit for controlling the data communication on the databus, which is set up for transferring the data provided for the mutual checking of the safety function in the continuous datastream, the continuous datastream also containing the data transmitted between the bus system control unit and input/output modules which are likewise connected to the databus. The datastream used as a communication bus for the input/output modules and the field bus coupler is therefore also used for the communication interface between the at least two mutually supplementary data processing units, which implement the safety function. For this purpose, the safety module is connected to one and the same databus as the input/output modules.

However, it is also conceivable for the safety module to have an interface controller for controlling the data communication on the databus and to be set up for transferring the data provided for the mutual checking of the safety function in a separate datastream on a dedicated databus for the safety module. The at least one safety module can therefore be operated on a different communication bus than the input/output modules.

The safety module preferably has fixing elements in order to be plugged onto a mounting rail in a manner known per se. In this embodiment, pressure contacts are preferably provided on the side faces which are connected to the data processing unit and are set up for connection to corresponding pressure contacts of adjacent modules and for setting up the databus when the safety module is plugged onto the mounting rail. A databus is therefore set up in a simple manner without any wiring complexity by a series of successive modules including the safety module being plugged on. This databus can also have voltage supply lines in addition to lines for the data transmission. The databus is preferably a serial bus, which can be in the form of a ring bus, for example.

In this embodiment, it is advantageous if the databus is looped through from the input of a safety module to an output of the safety module for connection to an input of an adjacent module through the safety module.

The object of the invention is furthermore to provide an improved automation system of the type mentioned at the outset.

The object is achieved by the at least one safety module, which is connected to the databus, and by a bus system control unit, which likewise has a data processing unit for ensuring correct data communication with a safety function. The data processing unit is set up in such a way that mutual checking of the safety function takes place by means of data exchange via the databus with the safety module. The safety modules and the bus system control unit are therefore matched to one another in terms of the safety-relevant functions and supplement one another in order to create, overall, a multi-channel, self-monitoring safe system.

The safety module and the automation system have the advantage that a standard automation installation can be subsequently extended by safe components. For this purpose, at least one safety module merely needs to be plugged onto the existing databus. With the aid of a subsequent firmware update of the field bus controller, i.e. the bus system control unit, the system then meets the requirements for defined safety stages. The same safety module can be used for a plurality of different field bus couplers and only needs to be certified once. By adding further safety modules, automation systems with multiple redundancy and associated increased safety can also be realized.

DESCRIPTION OF THE DRAWINGS

The invention will be explained in more detail below with reference to exemplary embodiments with the attached drawings, in which.

DESCRIPTION

Figure 1:
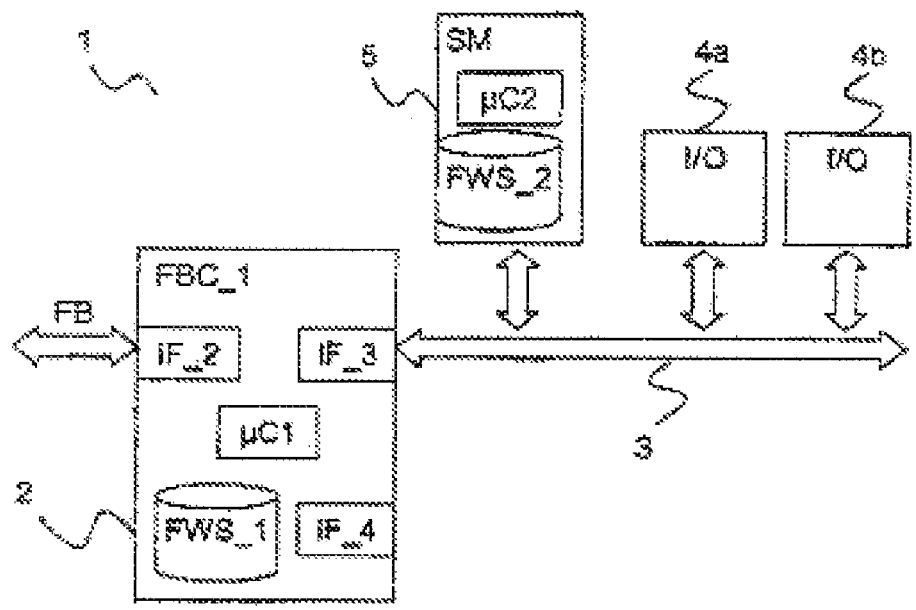
FIG. 1 shows a block diagram of an automation system with a safety module and input/output modules on a databus of a bus system control module.

FIG. 1 shows a block diagram of an automation system 1, which has a bus system control module 2 with an interface IF_2 to a field bus. The field bus can function, for example, in accordance with the PROFIbus, Ethernet or a similar standard. The bus system control module represents a field bus controller, which can be latched onto a mounting rail and forms a head module for an internal databus 3, such as the so-called S-bus, for example. For this purpose, the bus system control module 2 has a further interface IF_3 for controlling and implementing the data exchange with input/output modules 4a, 4b, which are connected to the databus 3. The number of input/output modules 4a, 4b can of course be as great as desired and is merely restricted by the addressability and the physical length of the databus 3.

The bus system control module 2 has a microcontroller µC1, which is operated via safe firmware PWS_1.

Furthermore, a safety module 5 is connected to the databus 3, which safety module likewise has a microcontroller µC2, which is operated by safety-relevant firmware PWS_2. The safety module 5 provides, in addition to the bus system control unit 2, identical data processing in order to be able to identify data processing errors as a result of identical data processing and comparison of the results of the data processing of the safety module 5 and the bus system control module 2. In order to safeguard the data communication via the databus 3 to the extent that data processing errors can be identified and possibly eliminated and it is possible to change the automation system 1 over to a safe state, the data processing units µC1 and µC2 of the bus system control module 2 and the safety module 5 are matched to one another in such a way that they implement mutual checking of the respective safety function of the bus system control module 2 and of the safety module 5 as a result of data exchange via the databus 3. The data processing units µC1 and µC2 are therefore not designed to be redundant either in the bus system control module 2 or in the safety module 5, but are arranged so as to be distributed and supplement one another using the databus 3 as the safety-relevant communication interface for the microcontrollers µC1 and µC2.

Figure 2:
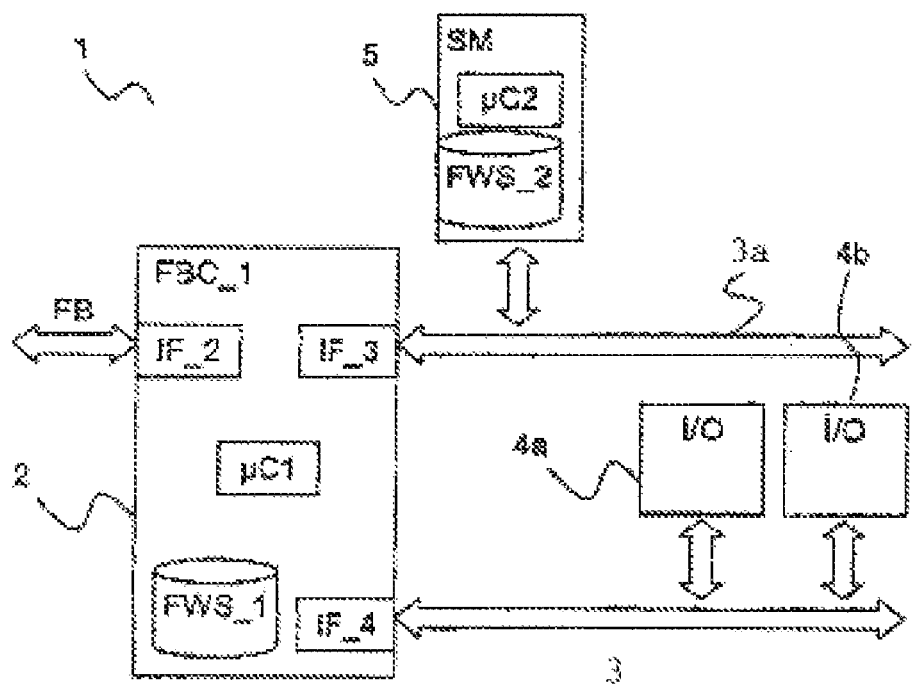
FIG. 2 shows a block diagram of a bus system control module with two mutually independent databuses and safety modules on one databus and input/output modules on the other databus.

FIG. 2 shows another embodiment of the automation system 1, in which the safety module 5 is connected to a dedicated databus 3a, while the input/output modules 4a, 4b are clamped onto a second, separate databus 3b. For this purpose, the bus system control module 2 has a further interface IF_4 for driving the further databus 3b. The safety module 5 is operated, for example, on a so-called S-bus as an internal communication bus 3a and the input/output modules 4a, 4b are operated on an internal communication bus K-bus.

Figure 3:
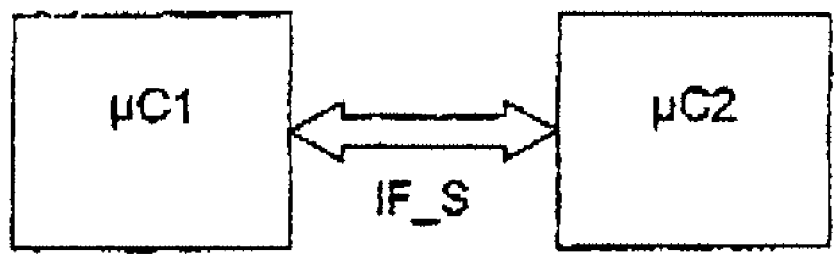
FIG. 3 shows a block diagram of two data processing units, which are connected to one another via a communication interface.

FIG. 3 shows a block diagram of the two data processing units µC1 and µC2 of the bus system control module 2 and the safety module 5 which are arranged distributed and separated from one another via the databus 3. It becomes clear that the mutual checking of the safety function takes place via the safety-related interface IF_S, which, given the conventional integration of the two microcontrollers µC1 and µC2 as a single module, is implemented as an internal interface and in the present invention is implemented using the databus 3.

The invention claimed is:

1. Safety module (5) for connection to a bus system control module (2), which is provided for connecting one or more input/output modules (4a, 4b) for field devices, via a databus (3), characterized in that the safety module (5) is separate from said bus system control module (2) and is connectable to said databus (3), and wherein said safety module (5) has a data processing unit (µC2) which is set up corresponding to the bus system control module (2) for redundant, identical processing of the data transmitted via the databus (3), and in that the data processing unit (µC2) is set up for ensuring correct data communication with a safety function in such a way that mutual checking of the safety function takes place by means of data exchange via the databus (3) with the bus system control module (2).

2. Safety module (5) according to claim 1, characterized in that the safety module (5) has an interface control unit for controlling the data communication on the databus (3), and in that the interface control unit is set up for transferring the data provided for the mutual checking of the safety function in the continuous datastream, which contains data transmitted between the bus system control module (2) and input/output modules (4a, 4b) which are likewise connected to the databus (3).

3. Safety module (5) according to claim 1, characterized in that the safety module (5) has an interface control unit for controlling the data communication on the databus (3), which interface control unit is set up for transferring the data provided for the mutual checking of the safety function in a separate datastream on a separate databus (3a) for the safety module (5).

4. Safety module (5) according to claim 1, characterized in that the safety module (5) has fixing elements for plugging the safety module (5) onto a mounting rail.

5. Safety module (5) according to claim 4, characterized in that the safety module (5) has pressure contacts on the side faces which are connected to the data processing unit ($\mu$C2) and are set up for connection to corresponding pressure contacts of adjacent modules selected from said bus system control module and said input/output modules (2, 4) and for setting up the databus (3) when the safety module (5) is plugged onto the mounting rail.

6. Safety module (5) according to claim 1, characterized in that the databus (3) has voltage supply lines in addition to lines for the data transmission.

7. Safety, module (5) according to claim 1, characterized in that the databus (3) is a serial databus.

8. Safety module (5) according to claim 7, characterized in that the databus (3) is looped through from the input of the safety module (5) to an output of the safety module (5) for connection to an input of an adjacent module selected from said bus system control module and said input/output modules (2, 4) through the safety module (5).

9. Automation system (1) with a bus system control module (2), a databus (3) and one or more input/output modules (4a, 4b), which are connected to the databus (3), with connection terminals for connecting field bus devices for data communication with the bus system control module (2), characterized in that at least one safety module separate from said bus system control module (2) is connected to the databus (3) and has a data processing unit ($\mu$C2) and the bus system control module (2) has a data processing unit ($\mu$C1) which is set up for ensuring correct data communication with a safety function in such a way that mutual checking of the safety functions takes place by means of data exchange via the databus (3) with the at least one safety module by redundant, identical processing of the data transmitted via the databus (3) by said data processing unit ($\mu$2) of said at least one safety module and said data processing unit ($\mu$C1) of said bus system control module (2).

* * * * *